Dec. 28, 1937.    N. J. BARDELL    2,103,839

METHOD OF MAKING POSTS

Filed June 15, 1936

Inventor:
Nicholas J. Bardell,
By Dyrenforth, Lee, Chritton & Wiles,
Attys.

Patented Dec. 28, 1937

2,103,839

UNITED STATES PATENT OFFICE 2,103,839

METHOD OF MAKING POSTS

Nicholas J. Bardell, Chicago Heights, Ill., assignor to Mid-West Forging Company, Chicago, Ill., a corporation of Illinois Application June 15, 1936, Serial No. 85,406

2 Claims. (Cl. 29—156)

This invention relates to improvements in posts and method of making the same and, more especially, a metal post adapted for various uses, for example, as a fence post, clothes line post, and the like.

Among the features of my invention is the making of a metal post that is hermetically sealed at the upper end to protect the interior thereof against weather.

Another feature is the provision of an annular groove on the outside of the post near the upper end to furnish means for attaching a wire or similar member to the post. The upper end of the post is pointed in order to give the same strength, rigidity and neat appearance.

Another feature of the invention is the improved process of making the new post.

Other features and advantages of my invention will appear more fully as I proceed with my specification.

In that form of device embodying the features of my invention shown in the accompanying drawing—

Figure 1:
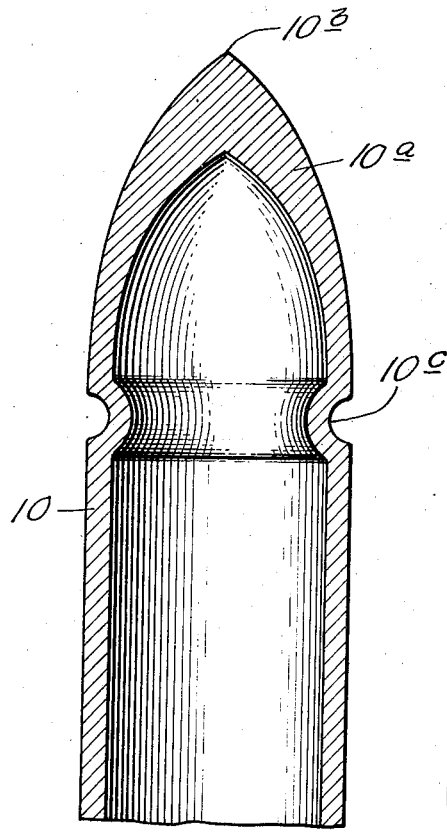
Figure 2:
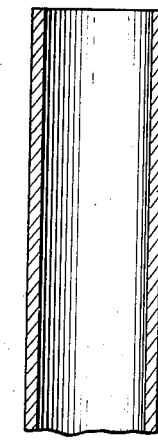
Figure 3:
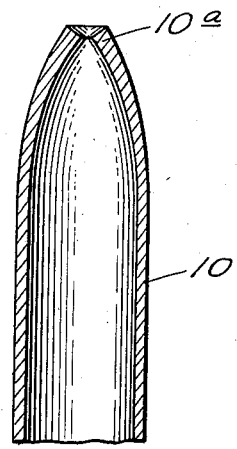
Figure 4:
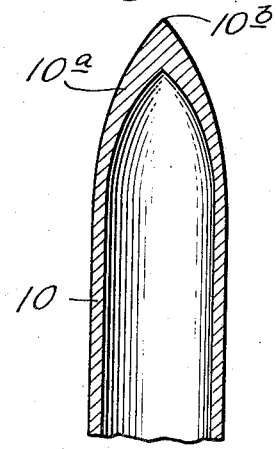
Figure 5:
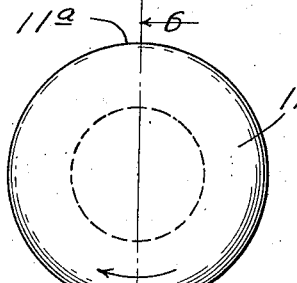
Figure 6:
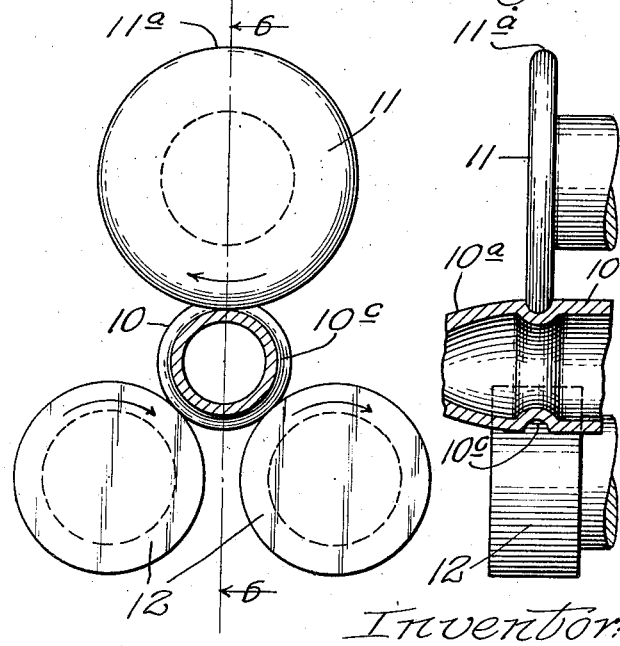

Figure 1 is a vertical sectional view; Figs. 2, 3 and 4 are similar views on a smaller scale showing steps in the process of making the post; Fig. 5 is a view showing the means and method of forming the annular groove in the post; and Fig. 6 is a view taken as indicated by the line 6 of Fig. 5.

One of the features of my invention is the process of making the improved post out of metal tubing circular in cross-section. In general, it may be stated that in making the post, a piece of tubing of suitable length is cut and the end then heated and closed by a suitable swedging operation. The material is hot enough so that as the end is closed, it is hermetically sealed. While the end is still hot, it is placed between rollers in order to form an annular groove.

As shown in the drawing, with particular reference to Fig. 2, 10 may indicate one end of a piece of metal tubing circular in cross-section and substantially the length of the completed post. This end of the tubing is then heated and by suitable swedging operation, the end of the tube is closed and pointed. These steps are shown in Figs. 2, 3 and 4. In Fig. 3, the end is shown as swedged inwardly and just about to be closed. In Fig. 4, the end is shown entirely closed. It is to be noted that the closed tapered end is integral with the post proper, there being no cap, joint or separate member. It is to be noted, also, that the closed tapered end is formed without any wrinkles, joints or connections. The post is preferably made from drawn seamless tubing; but it also may be made from any other kind of tubing, for example, welded tubing. The end of the tubing is reduced in diameter, the metal of the end being integral to hermetically seal the end of the post. This process results in some thickening of the wall at the end, as indicated by $10^a$. $10^b$ indicates the extreme end which is preferably pointed. This makes a strong, rigid and durable structure. The metal wall around the entire post end consists of metal of continuous texture, there being no slots, divisions or connections.

After the end of the post has been closed and while the same is still hot and in a malleable condition, it is placed between three rollers, as shown in Fig. 5. 11 indicates a driven roller and 12, 12, flat idler rollers. The periphery of the driven roller is rounded, as indicated by $11^a$, in order to form the annular groove $10^c$ around the post near the end.

While I have shown and described certain embodiments of my invention, it is to be noted that it is capable of many modifications. Changes, therefore, in the construction and operation may be made without departing from the spirit and scope of the invention as disclosed in the appended claims, in which it is my intention to claim all novelty inherent in the invention as broadly as permissible, in view of the prior art.

What I claim as new, and desire to secure by Letters Patent, is:

1. The process of making a metal post with a closed upper end and having an exterior annular groove, consisting of providing a suitable length of metal tubing, heating the end to make the same malleable and while hot, swedging the end until the same is closed and hermetically sealed and thickened and while still hot and malleable, forming an exterior annular groove therein approximately at the juncture of the thickened end with the remainder of the post.

2. The process of making a metal post with a closed upper end and having an exterior annular groove, consisting of providing a suitable length of metal tubing, heating the end to make the same malleable and while hot, swedging the end until the same is closed and hermetically sealed and thickened and while still hot and malleable, forming an exterior annular groove therein approximately at the juncture of the thickened end with the remainder of the post by rolling the same in contact with the periphery of a groove-forming roller.

NICHOLAS J. BARDELL.